(12) United States Patent
Andol

(10) Patent No.: US 9,877,611 B2
(45) Date of Patent: Jan. 30, 2018

(54) PORTABLE COOKING GRILL

(71) Applicant: Mark S. Andol, Cowlesville, NY (US)

(72) Inventor: Mark S. Andol, Cowlesville, NY (US)

(*) Notice: Subject to any disclaimer, the term of this patent is extended or adjusted under 35 U.S.C. 154(b) by 328 days.

(21) Appl. No.: 14/699,288

(22) Filed: Apr. 29, 2015

(65) Prior Publication Data
US 2015/0305561 A1 Oct. 29, 2015

Related U.S. Application Data

(60) Provisional application No. 61/985,936, filed on Apr. 29, 2014.

(51) Int. Cl.
*A47J 37/07* (2006.01)

(52) U.S. Cl.
CPC ....... *A47J 37/0763* (2013.01); *A47J 37/0704* (2013.01)

(58) Field of Classification Search
CPC .............. A47J 37/0763; A47J 37/0704; A47J 2037/0795; F24B 1/182; F24B 1/202
See application file for complete search history.

(56) References Cited

U.S. PATENT DOCUMENTS

| | | | |
|---|---|---|---|
| 2,959,165 A * | 11/1960 | Mark | A47J 37/0763 126/304 R |
| 3,682,154 A | 8/1972 | Mollere | |
| 4,210,072 A | 7/1980 | Pedrini | |
| 4,211,206 A | 7/1980 | Darbo | |
| 4,334,516 A | 6/1982 | Dittrner et al. | |
| 4,508,094 A | 4/1985 | Hait | |
| 4,531,505 A | 7/1985 | Hait et al. | |
| 4,714,013 A | 12/1987 | Telfer | |
| 4,829,975 A | 5/1989 | Haft | |
| 5,094,223 A | 3/1992 | Gonzalez | |
| 5,495,845 A | 3/1996 | Hait | |
| 5,592,871 A | 1/1997 | Bartlett | |
| 5,605,142 A | 2/1997 | Parker | |
| 5,640,949 A | 6/1997 | Smith | |
| 5,758,570 A | 6/1998 | Hill | |
| 6,131,560 A | 10/2000 | Healy | |
| 6,189,528 B1 | 2/2001 | Oliver | |

(Continued)

OTHER PUBLICATIONS

Made in America Store, "Campfire Ring System," brochure, 2013, pp. 1-4.

*Primary Examiner* — Alfred Basichas
(74) *Attorney, Agent, or Firm* — James C. Simmons

(57) ABSTRACT

A grill which is convertible between a form for use for cooking and a compact form for carrying. The grill comprises a base member for supporting a fire and having a plurality of legs extending from one surface thereof, a fire ring receivable on the base member and extending along a perimeter of the base member and having a width to rise above the base member for containing a fire thereon, a grate for receiving food to be cooked, and a rod for positioning the grate above the base member. In the compact form, the grate, base member, and fire ring are connected together in the form of a suitcase with the grate and base member engaging opposite edges of the fire ring and defining sides of the suitcase and with the legs positioned to lie between the grate and base member and with the rod received in holes in the fire ring and engaging the legs thereby connecting the base member to the fire ring.

20 Claims, 9 Drawing Sheets

(56) References Cited

U.S. PATENT DOCUMENTS

| | | |
|---|---|---|
| 6,293,274 B1 | 9/2001 | Anderson et al. |
| D449,269 S | 10/2001 | Gower |
| 6,546,851 B1 | 4/2003 | Osborne |
| 6,814,383 B2 | 11/2004 | Reed, III et al. |
| D586,610 S | 2/2009 | Hu |
| 7,798,139 B2 | 9/2010 | Gagas et al. |
| 7,918,220 B2 | 4/2011 | Montano et al. |
| 7,960,673 B2 | 6/2011 | Li et al. |
| D662,348 S | 6/2012 | Siow |
| 8,201,550 B2 | 6/2012 | Malumyan |
| 8,220,449 B2 | 7/2012 | Rheault |
| D677,526 S | 3/2013 | Wade |
| 8,464,702 B2 | 6/2013 | Foster |
| 2007/0006863 A1 | 1/2007 | Barbarich |
| 2009/0223945 A1 | 9/2009 | Koon et al. |

\* cited by examiner

PORTABLE COOKING GRILL

Priority of provisional application 61/985,936, filed Apr. 29, 2014, the disclosure of which is incorporated herein by reference, is hereby claimed.

The present invention relates generally to cooking grills. More particularly, the present invention relates to a cooking grill which is portable.

I have had on sale, for over a year before the aforesaid provisional application was filed, through my Made in America Store what I have called a "Campfire Ring System," made of 100% American made products to help keep America prosperous with Americans in jobs, which includes (1) a cylindrical fire ring having a tubular adapter partially closed at its lower end, (2) a circular base member with legs along its perimeter, the legs having footpads located outwardly of the base member perimeter and each extending in the same circumferential direction, and further having a flange or lip along its perimeter for receiving the fire ring, (3) a pole having a lower end which is receivable within the tubular adapter, and (4) a cooking grate which has a tubular adapter for receiving the upper end of the pole, and a threaded member for being threadedly received in a nut attached to the grate adapter and an aperture in the grate adapter for pinching the pole to secure the grate in a desired position vertically over a fire produced in the confines of the fire ring. The threaded member is bent so that its outer end portion serves as a handle for applying sufficient torque for tightening against and pinching the pole. The system is composed of stainless steel. While charcoal may be applied within the confines of the fire ring for effecting a fire, a threaded aperture is provided centrally of the base member for optionally applying a burner.

My above system has a ring diameter of about 31 inches and a weight of greater than 100 pounds, which would not suitably allow portability thereof. Thus, an average single person could not pick it up with a handle and carry it like a suitcase is carried.

Moreover, my above system, with its foot pads disposed at least partially outside of the perimeter of the base member (and therefore at least partially outside the perimeter of the fire ring), does not allow the legs to be received within the fire ring to achieve the desired compactness for portability.

There have been attempts to provide portable cooking grills. For example, U.S. patent application publication 2007/0006863 to Barbarich discloses what is described as a lightweight, collapsible, easy to use, compact, flat, and portable charcoal grill which has multiple hinges to allow it to be folded into a flat mode for storage and transport and which has two carrying handles (see FIG. 2 thereof for an illustration of such folded condition).

For another example, U.S. Pat. No. 6,293,274 to Anderson et al discloses what is described as a portable, self-contained stove which includes a container and an adjustable cooking platform which selectively fits into storage and cooking positions with respect to the container. The cooking platform is compressible and extendible and is selectively placed within the container, it being stated to thereby avoid the loss of the platform and conserving space within the container.

For yet another example, U.S. Pat. No. 4,211,206 to Darbo discloses a cooking grill using charcoal, wood, etc. which has four sides hinged to a base plate to fold in upon the base. A wire grid holds and locks the folded stack together and provides a handle for the pack.

For still another example, U.S. Pat. No. 6,546,851 to Osborne discloses a portable cooking grill wherein the various parts may be disassembled and stored in a tube (see FIG. 4 thereof).

For another example, U.S. Pat. No. 5,495,845 to Hait discloses a compact outdoor cooking unit having a cooking mode and a transport and storage mode, wherein the stove is foldable, including legs being foldable, the pan is seated on the base within upstanding walls of the base, a griddle seats on the pan with depending walls of the griddle surrounding the pan, and the base, pan, and griddle have vertically aligned handle hooks (see FIGS. 1 and 2 thereof). In the transport and storage mode, a strap surrounds the base, pan, and griddle and passes through the handle hooks for maintaining the unit in the compact mode. A butane or propane heating system (see FIGS. 9 and 10 thereof) is provided for igniting and burning charcoals or briquettes disposed on the fire grate. The system includes a hose which leads from the gas source to a gas burner fitting head seated on the fire grate of the stove.

For still another example, U.S. Pat. No. 5,640,949 to Smith discloses a portable barbecue grill assembly which is mountable to a trailer receiver hitch of a motor vehicle and cantilevered therefrom to allow the assembly to be taken freely anywhere. See also U.S. Pat. No. 6,814,383 to Reed III et al.

For a further example, U.S. Pat. No. 6,131,560 to Healy discloses a portable grill having telescoping legs which are pivotally attached to a rectangular grate. When the legs are pivoted into the portable form, a carrying case is provided therefor.

For yet another example, U.S. Pat. No. 5,605,142 to Parker discloses a gas-fired portable barbecue. When detached, the gas bottle, regulator, and discharge tube stow within the barbecue. Integral, pivotal leg structures lying within the combustion chamber shift between stowed positions where they are positioned interiorly of the exterior surface of the barbecue and supporting positions where they stably support the barbecue on a surface. A stowed barbecue position is shown in FIG. 1 thereof wherein it looks like a suitcase, and is shown to have handles.

Other art which may be of interest to the present invention (disclosing various other so-called portable grills/stoves many of which are foldable) include U.S. Pat. Nos. 3,682,154, 4,210,072, 4,334,516, 4,508,094, 4,531,505, 4,714,013, 4,829,975, 5,094,223, 5,592,871, 5,758,570, 6,189,528, 7,798,139, 7,918,220, 7,960,673, 8,201,550, 8,220,449, 8,464,702, D449269, D586610, D662348, and D677526, and U.S. published patent application 2009/0223945.

All of the above patents and published patent applications are incorporated herein by reference.

The so-called portable grills in the above art have shortcomings so that in general, at best, portability thereof would be awkward, either in the actual conversion thereof or in the actual carrying thereof.

It is accordingly an object of the present invention to provide a cooking grill which is easily and quickly convertible to a form in which it can be carried by one hand similarly as one would carry a suitcase.

In order to provide such a portable cooking grill, in accordance with the present invention, the components are re-assembled into a compact form like that of a suitcase, with the legs to the interior, and providing a handle so that the portable cooking grill in such a compact form can be picked up by the handle and carried by one hand similarly as one would carry a suitcase.

The above and other objects, features, and advantages of the present invention will be apparent in the following detailed description of the preferred embodiments thereof when read in conjunction with the appended drawings in which the same reference numerals depict the same or similar parts throughout the several views.

DETAILED DESCRIPTION OF THE PREFERRED EMBODIMENT(S)

Figure 1:
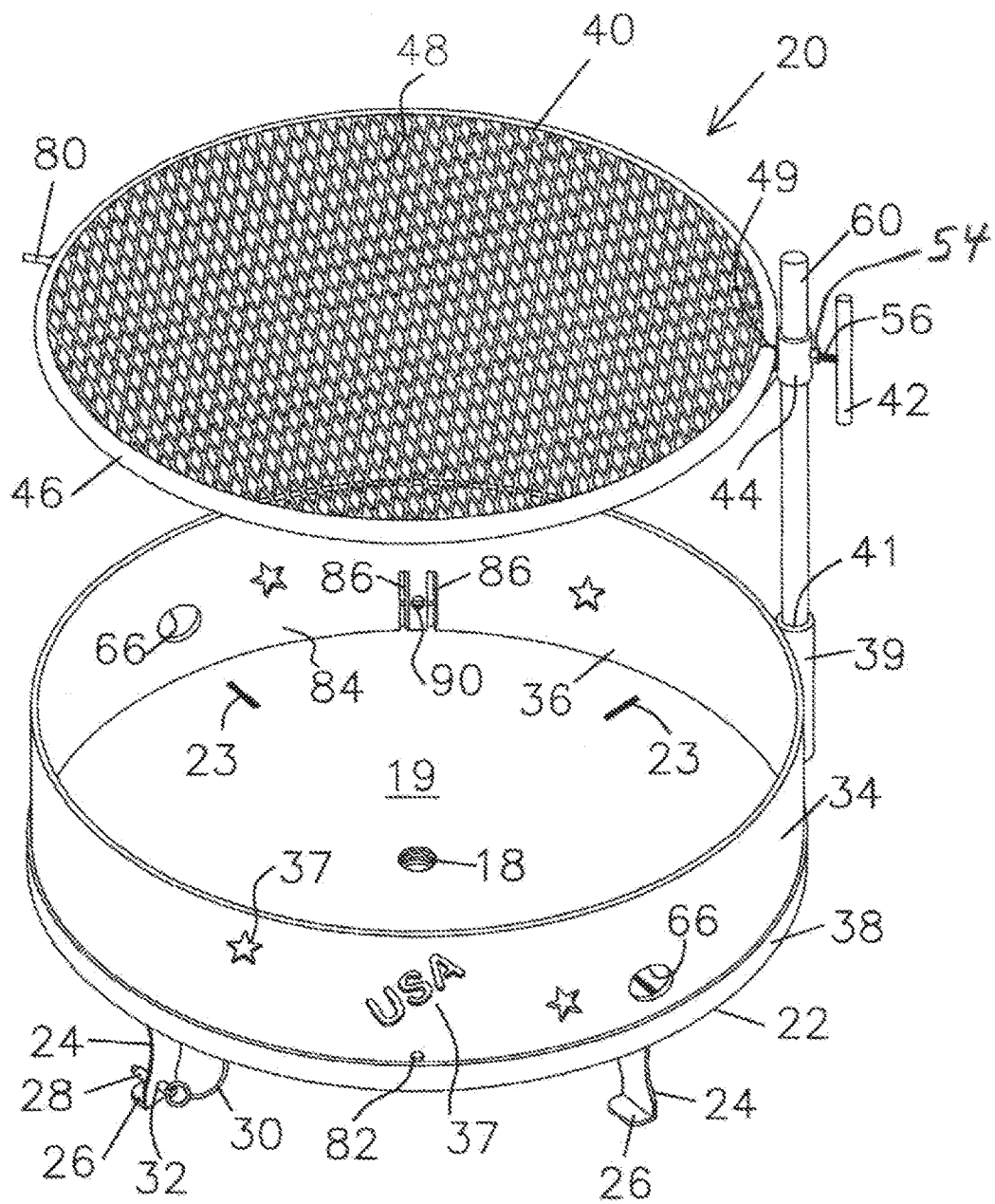
FIG. 1 is a perspective view of a cooking grill which embodies the present invention, assembled in a first assembly for use for cooking.

Referring to FIG. 1, there is shown generally at 20 a cooking grill composed of stainless steel, for example, 304 stainless steel (for long life and to be free of rust) or other suitable material and having four major parts, which are illustrated in FIG. 1 to be assembled for cooking (first assembly)

A first of the major parts is a circular base member 22 composed of a flat plate portion 19 having four (or other suitable number) legs 24, whose lower ends are suitably bent to terminate in foot pads 26, equally spaced along its perimetric portion or otherwise suitably positioned on the base 22 for support thereof. It should be noted that, for purposes which will hereinafter become apparent, the foot pads 26 do not extend outwardly of or overlap the perimeter of the base member 22 or the inner perimeter of the hereinafter discussed fire ring 34 to thereby allow the legs to be received within the confines of the fire ring. However, as pointed out hereinafter in connection with the second assembly, two of the legs 24 should preferably be diametrically opposed. Ends of the legs 24 are inserted preferably halfway in slots, illustrated at 21 (FIG. 2), which are laser cut or otherwise suitably formed in the plate 19 and the legs 24 welded thereto as by welds illustrated at 23 which are built up in the slots 21 to be even with the upper surface of the plate 19, or otherwise suitably attached thereto so that the legs do not protrude above the upper surface of the plate.

A key pin 28 (whose purpose will be discussed hereinafter) is attached thereto by a lanyard 30 (see FIG. 6) so that it is not lost and is inserted in a hole, illustrated at 32, in one of the legs 24 so that it does not rattle around during use of the grill 20 for cooking.

The base 22 has a circular lip or flange 38 which rises (when in the first assembly) from the perimetric edge of the plate 19. While the lip 38 may be attached to the plate 19 in any suitable manner such as welding, the combination of the plate 19 and lip 38 is preferably formed by the commonly known metal spinning process, preferably with use of a CNC lathe, thereby to eliminate the labor intensive welding step for decreased costs of production.

Located centrally of the plate 19 or otherwise as suitable is a hole extending therethrough in which is received an internally threaded tube 18 (see FIG. 2) extending therethrough and protruding below the lower surface and welded or otherwise suitably attached thereto as by weld 17 to allow attachment threadedly of an optional burner such as a butane burner and to allow drainage from the base 22. Thus, the burner may be screwed into the threaded hole 18 from the top and a fuel hose fitting screwed in from the bottom. Alternatively, a suitable fitting can be screwed into the threaded hole 18 for connection of a burner thereto. A plug (not shown) is desirably provided to plug the tube to protect the threads when not so used and to keep coals from falling out, but may be removed to allow drainage.

A second of the major parts is the cylindrical fire ring 34 whose lower circular edge portion 36 is sized to fit snugly or tightly within the flange or lip 38 of the base 22 to be secured thereby. Ornamental or other suitable cut-outs, illustrated at 37, may desirably be formed through the wall of the ring 34 to provide additional oxygen for the burning coals as well as for ornamental or other purposes (note that "USA" is right side up in FIG. 1, and is upside-down in FIGS. 2 and 3). The ring 34 is formed of a flat sheet which is formed to have the desired circular curvature and whose ends are then attached such as by weld 35 (seen partially in FIG. 2).

Also suitably welded (or otherwise suitably attached) along weld line 35 to the ring 34 is a tubular adapter member 39 having a cylindrical passage, illustrated at 41, extending therethrough and partially closed at its lower end by a lip 43 (FIG. 2) having a drainage hole 45 (which may be formed by a washer welded or otherwise suitably attached to the lower end of the tube 39.

A third of the major parts is a circular cooking grate or upper rotator 40 which has a handle 42 (which has different functions in the first and second assemblies respectively, as discussed hereinafter) threadedly attached to a cylindrical or tubular adapter 44, having a through passage 47 (FIG. 4), attached to the grate 40. The grate 40 seen in FIG. 1 is composed of round bar 46 (for example, ½ inch round bar) formed into a circle with its ends attached such as by weld 49 and of expanded metal 48 (for example, ½ inch expanded metal) suitably attached to the round bar such as by welding (not shown for ease of illustration).

Figure 7:
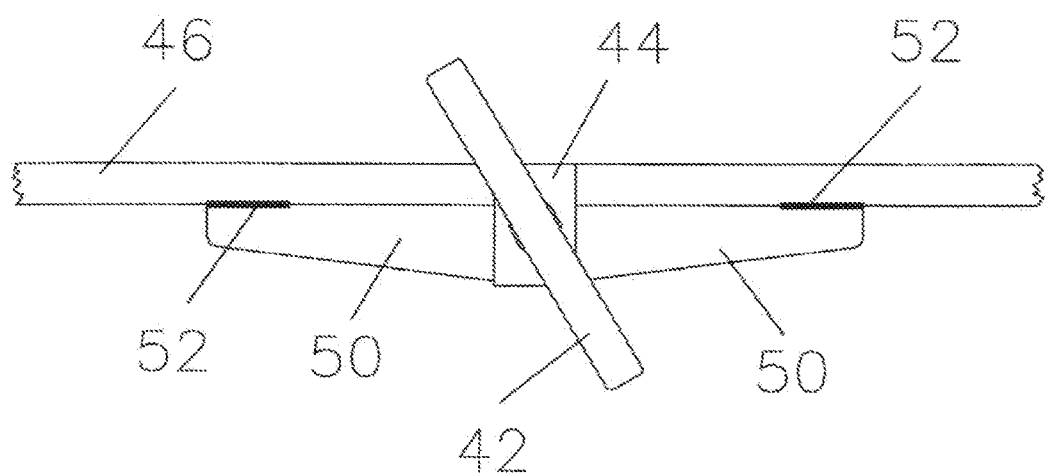
FIG. 7 is an enlarged partial edge view of the cooking grate at the location of the handle.
Figure 8:
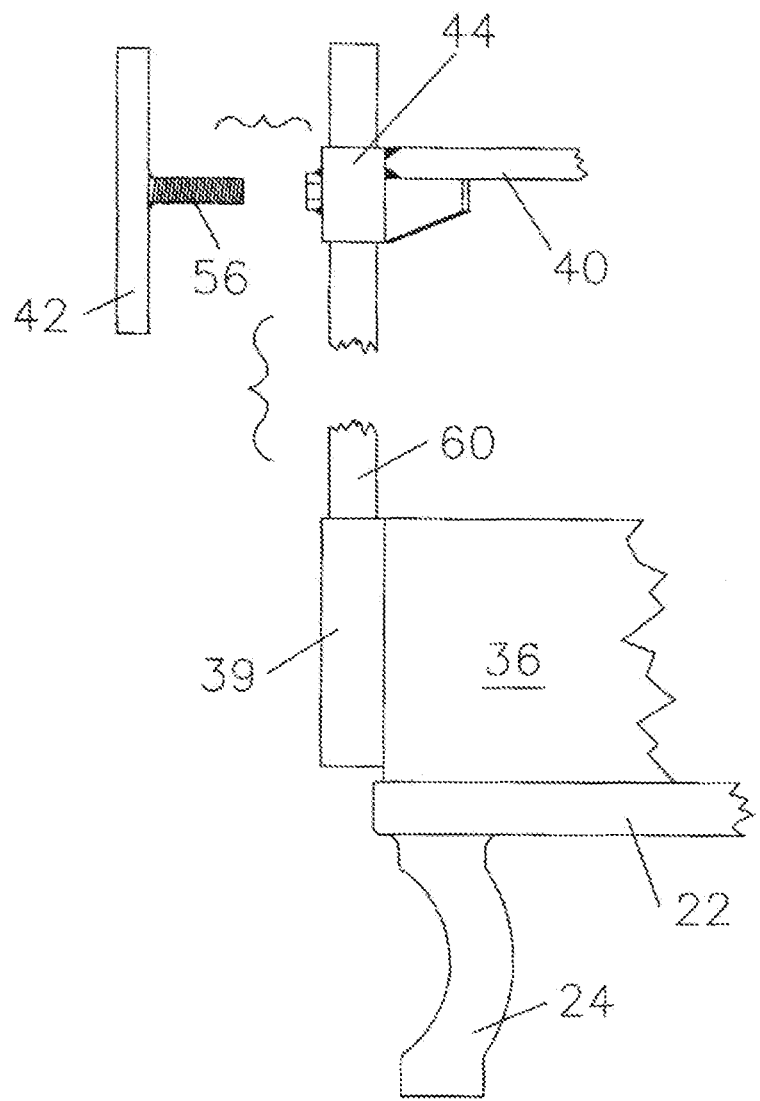
FIG. 8 is an enlarged partial view along the pole member for the first assembly.

For attachment of the adapter 44, referring to FIG. 7, a pair of strengthening brackets 50 are suitably attached to the round bar 46 at their outer ends suitably such as by welds 52 and to the round bar 46 at their inner ends and to each other and to the adapter 44 and the adapter 44 to the round bar 46 suitably such as by other welds (not shown). A nut 54 (FIG. 1) or other suitable threaded member is welded (weld not shown) or otherwise suitable attached to the adapter 44 to align with a similarly threaded hole in the adapter 44 so as to threadedly receive a threaded stud 56 emanating from the handle portion 42, centrally thereof. Thus, the threaded stud 56 can be screwed by manipulating the handle 42 to pass into the space or passage 47 within the adapter 44. The handle 42 is a solid rod with a nut 58 (FIG. 4) welded (not shown) or otherwise suitably attached midway or centrally thereof so as to allow the compact form (FIG. 3) to be easily picked up by the handle and carried with one hand by a single person. The stud 56 is threadedly received in the nut 58 and secured such as by welding thereto.

A fourth of the major parts is a cylindrical solid rod or pole member or stand 60 whose lower end portion is rotatably receivable within the adapter opening 41 to rest on the lip 43 (thus allowing the grate 40 to be moved away from its position directly above the base 22 to allow working with charcoal therein) and whose upper end portion is receivable within and can pass entirely through the passage of the grate adapter 44. The grate 40 is held at a desired height by screwing the stud 56 inwardly by manipulating the handle portion 42 to pinch the pole 60.

To set the grill 20 up for use, with the hole 18 plugged (unless a burner is being used), the base 22 is set down to rest on its legs 24. The ring 34 is then set within the lip 38. One end of the pole is then set within the tubular hole 41 to rest on the lip 43. With the stud 56 unscrewed from blocking the passage 47, the other or upper end of the pole 60 is then received within the passage 47 of the adapter 44, adjusted to the desired height, and the stud 56 tightened with the handle 42 to maintain the grate 40 at the desired height. The grate 40 may be rotated away from over the base 22 (with the stud loosened) by rotation of the pole within the passage 41 of the lower adapter 39 so that charcoal can be more easily added to or removed from the base 22 or for other purposes, then the grate may be returned to its position over the base 22 and the stud tightened. With the charcoal burning (or with a burner in operation), food may be placed on the grate 40 for cooking thereof. After cooking is completed, the grate 40 may be lowered to act as a safety grate.

In order to be truly portable, the grill 20 must be compacted to a form which allows it to be easily carried, i.e., a form like a suitcase. Thus, in accordance with the present invention, to provide the desired easy portability, the parts are of reduced size, as hereinafter discussed, suitable for tailgating, camping, recreational vehicles, and the like, and, after use, the parts are disassembled and cleaned up, then re-assembled into the compact form shown in FIG. 3 which may be said to be similar to the form of a suitcase wherein the re-assembled grill may be carried like a suitcase with one hand holding onto the handle 42 and with desirably all parts secured, as discussed hereinafter, so that there are no loose parts to rattle around or get lost.

Figure 2:
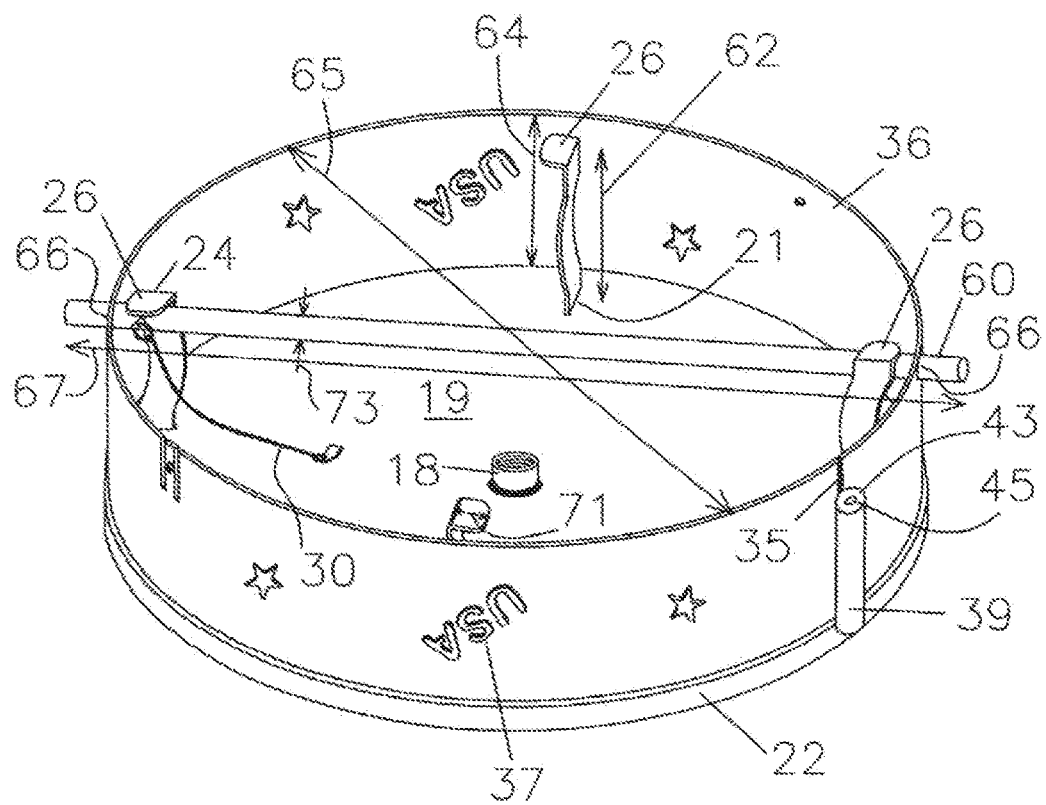
FIG. 2 is a perspective view of a partial assembly of the cooking grill into a second assembly for porting thereof.

FIG. 2 shows the grill partially re-assembled. Note that in this partial re-assembly, the base 22 is shown upside-down, with its legs 24 sticking up, and with the ring 34 engaging what during normal use as a grill is the lower surface of the base sheet 19. Thus, the ring 34 is shown to surround the legs 24, including their foot pads 26, so that, when viewed in the fully assembled form of FIG. 3, with the base defining one side and the grate 40 defining the other side of the re-assembled unit, the legs 24 are to the inside of the unit and thus out of the way. This thus requires, in accordance with the present invention, each of the legs 24 to be shorter than the height, illustrated at 64, of the ring 34. For a ring height 64 of, for example, about 5 inches, the leg height, illustrated at 62, is, for example, about 4¼ inches.

Referring again to FIG. 2, the ring 34 as well as the pole 60 are secured to the base 22 by passing the pole 60 at both ends thereof through two diametrically opposed holes, illustrated at 66 (best seen in FIG. 1), and underneath a pair of diametrically opposed ones of the footpads 26, whose widths, illustrated at 71, are preferably at least equal to (or a little wider than) the pole diameter, illustrated at 73, for example, about 1 inch for a pole diameter 73 of about ¾ inch. The footpads 26 (at least a pair of diametrically opposed footpads) desirably extend in the same circumferential direction for best attachment of the legs to the pole 60.

Figure 6:
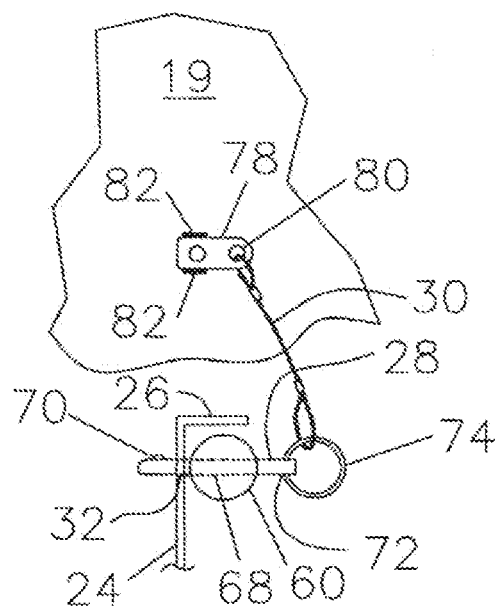
FIG. 6 is an enlarged partial view of the base member therefor, illustrating the use of a pin for securing the pole member to a leg for the second assembly.

After having been removed from its secure resting place in hole 32 of a leg, the pin 28, as best seen in FIG. 6, is inserted in a hole, illustrated at 68, in the pole 60 then re-inserted in the hole 32 in the leg 24. This thus requires that at least two of the legs 24 be diametrically opposed. Referring to FIG. 6, the pin 28 has a suitably sized detent 70 (or nodule in the form of a raised bump) near its end so that a substantial force (more than inadvertent force) is required for its removal, thus preventing the pin 28 from becoming inadvertently removed. The pin 28 is suitably secured, to prevent it from becoming lost, to the base sheet 19, for example, as follows. The other end of the pin 28 has a hole, illustrated at 72, in which is received a suitable key ring 74. The key ring 74 is suitably attached to a lanyard 76 which is suitably attached to a member 78 by means of hole 80, and the member 78 is suitably attached to the base sheet 10 such as by welds 82.

With one edge of the ring 34 engaging the base 22, the grate 40 is caused to engage and is secured to the other edge of the ring 34, as hereinafter discussed, received to the inside of the ring 34 to provide the compact suitcase-like form illustrated in FIG. 3. Thus, the diameter, illustrated at 73 (FIG. 4), of the grate 40 is less than the inside diameter of the ring 34, for example, about 14½ inches for a ring outer diameter 65 of about 15 inches and thickness of about ⅛ inch.

Grills may often be made which have ring outer diameters of 31 inches or more and which weigh in excess of 100 pounds, clearly too large and heavy for portability for recreational use. In order to make the grill 20 conveniently portable for use, for example, for tailgating or camping or recreational vehicle use, in accordance with the present invention, it is made to have a reduced size and weight, for example, about 20 pounds and a ring outer diameter 65 of about 15 inches, the ring width or height 64 being, for example, about 5 inches, suitable for providing the desired compactness for easy portability thereby to allow it to be carried similarly as one would carry a suitcase. Unless otherwise specified, various dimensions and the like are given herein for exemplary purposes only and not for purposes of limitation.

In order to be considered suitable for portability, there is a limit to the size and weight of the grill 20. As used herein and in the claims, the term "portable," when referring to the grill 20, is defined as the weight of the grill 20 being less than about 50 pounds and with the ring 34 diameter 65 (i.e., its outer diameter, and for non-circular rings as well as for non-circular base members and grates, by "diameter" is meant, for purposes of this specification and the claims, the largest dimension, for example, the distance between opposite corners of a ring or base member or grate which is square or rectangular shaped) being less than about 24 inches and with the ring 34 having a reasonable depth 64. To contain the fire, the ring 34 width or depth 64 would normally be about 5 inches, but at least about 3 inches, and an increase of a few inches in the ring depth 64 to as much as about a foot (about 12 inches) would not detract from the grill still being considered to be portable. Thus, a ring depth 64 of less than about 1 foot is meant to come within the above definition of "portable."

The pole or stand 60 must be long enough and the hole 68 positioned so that the ends substantially stick out (but not too far) through the wall of the ring 34 at each end, as seen in FIG. 2. The length of the pole 60 is accordingly preferably about 1 inch longer than the ring diameter 65. Thus, for the exemplary ring diameter 65 of about 15 inches, the pole length 67 may, for example, be about 16 inches, allowing the pole to protrude at each end about ½ inch. The hole 68 in the pole for receiving the pin 28 is located, for example, about 2 inches from an end of the pole 60 to thereby allow the secured pole to protrude the desired distance at each end.

Further exemplary, the thicknesses of the ring, base sheet, base lip, and legs may each, for example, be about ⅛ inch. The lip 38 extends upwardly from the base sheet or floor 19 a distance of about ¾ inch. The length and diameter of handle 42 are about 4½ inches and ½ inch respectively. The lengths of the adapters 39 and 44 are about 4 inches and 1½ inch respectively.

Figure 3:
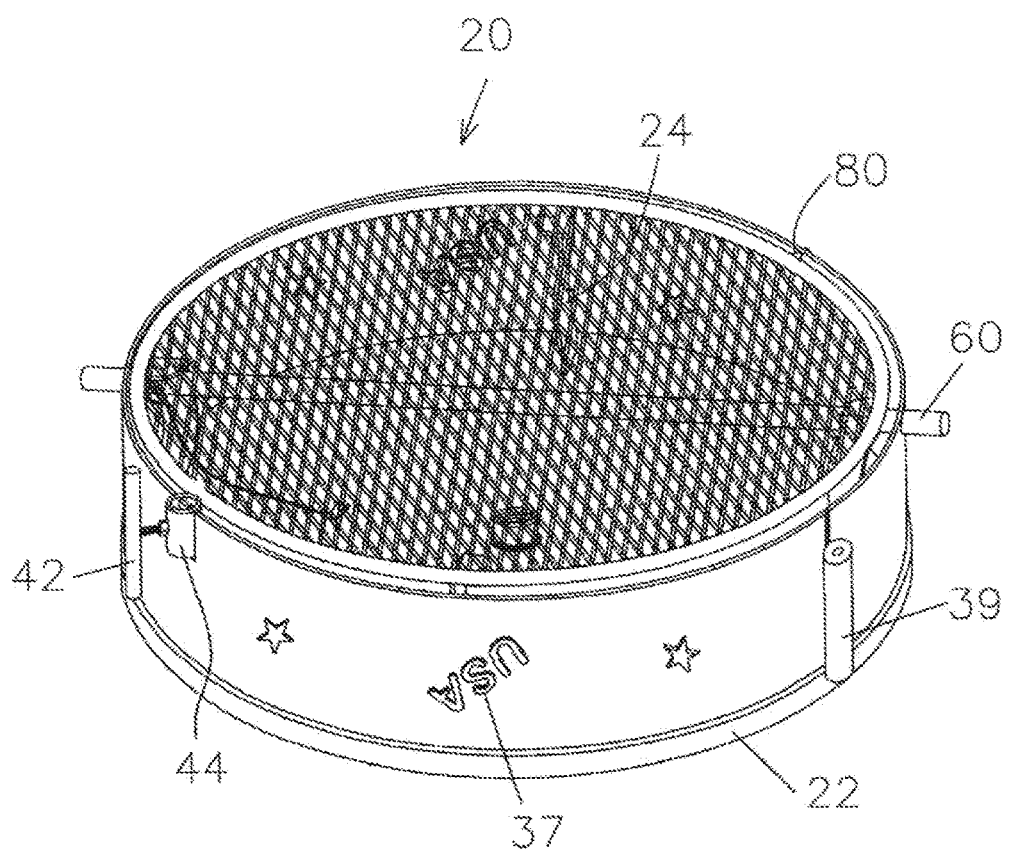
FIG. 3 is a perspective view of the cooking grill fully assembled into the second assembly for porting thereof.
Figure 4:
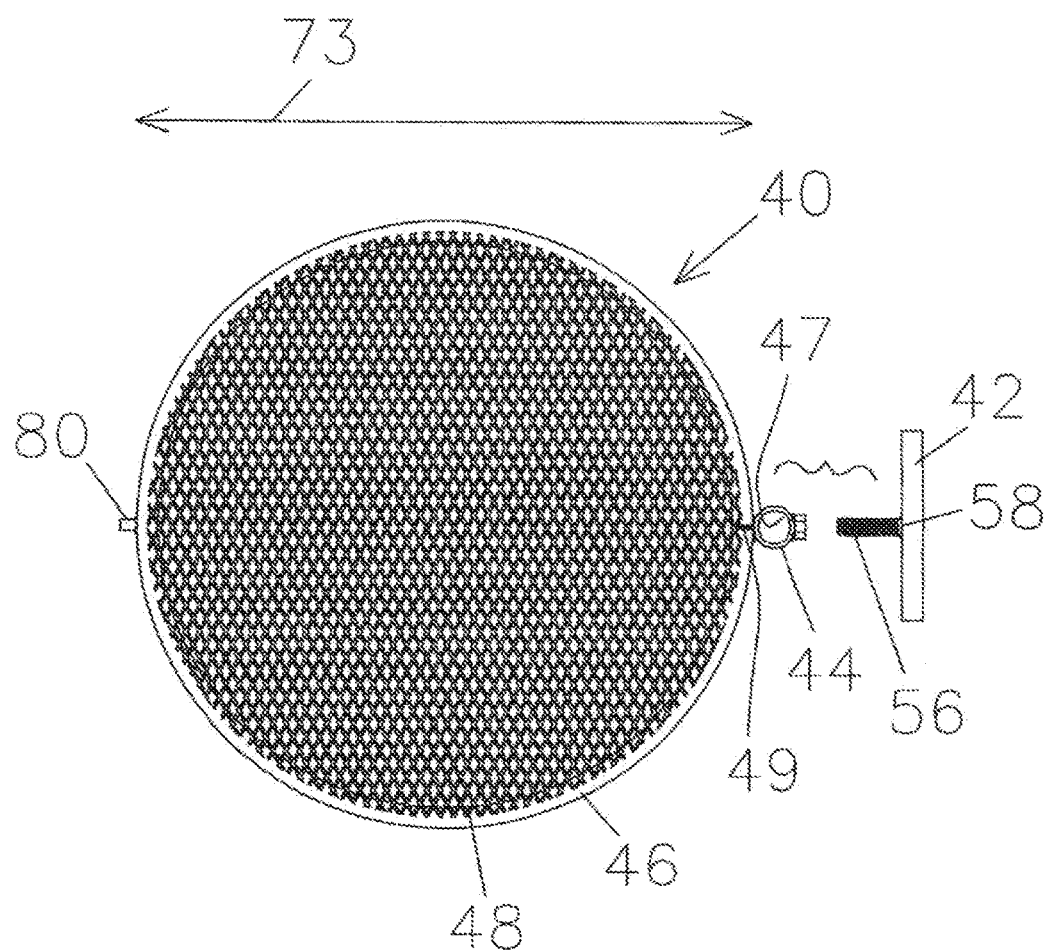
FIG. 4 is a plan view of the cooking grate therefor.
Figure 5:
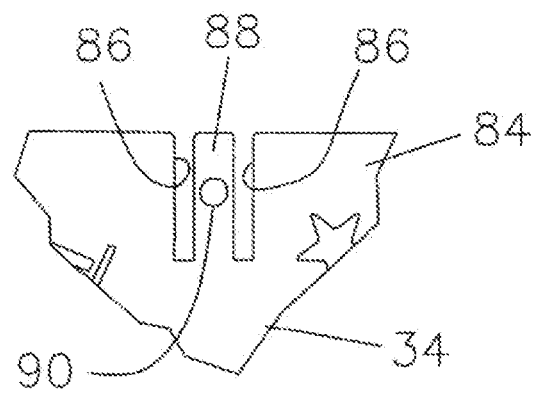
FIG. 5 is an enlarged partial view of the ring therefor, illustrating means on the ring for attachment of the cooking grate for the second assembly.

Referring to FIG. 4, the grate 40 has, diametrically opposite the adapter 44, a cylindrical (or otherwise suitably shaped) knob 80 welded (or otherwise suitably attached) thereto to extend outwardly therefrom. An aperture, illustrated at 82, is provided in the ring lower edge portion 84 (as seen in FIG. 1 with the grill set up for use) for receiving the grate knob 80, as seen in FIG. 3. Referring also to FIG. 5, diametrically opposite the aperture 82 also in the lower edge portion 84 of the ring are a pair of parallel spaced slots, illustrated at 86, formed in the ring upper edge and extending upwardly therefrom, for receiving, while the stud 56 is unscrewed from the space within the adapter 44, diametrically opposite sides respectively of the wall of the grate adapter 44, as also seen in FIG. 3, wherein a portion 88 between the slots 86 is received within the tubular adapter 44. Located in the portion 88 intermediate the slots 86 is an aperture, illustrated at 90, for receiving the stud 56 when the knob or nipple 80 is received in the aperture 82 for thereby securing the grate 40 to the ring 34, and the handle 42 tightened, to complete the suitcase-like assembly, with all parts secured, as seen in FIG. 3, for easy portability for recreational use.

After disassembly and appropriate cleaning and after the key 28 is removed from the aperture 32, the parts can be re-assembled for easy suitcase-like carrying by (1) fitting the ring 34 to the base 22 so that the legs 24 are received within the confines of the ring 34, wherein the legs 24 are located on the outer perimeter of the base 22 so as to advantageously maintain the perimeters of the base 22 and ring 34 in alignment, (2) inserting the pole 60 through the diametrically opposed apertures 66 in the ring 34 and underneath the footpads 26 of two diametrically opposed ones of the feet 24 and inserting the key 28 through the aperture 68 in the pole 60 and the aperture 32 in one of the feet 24 to secure the pole 60 and to secure the ring 34 to the base 22, and (3) inserting the grate knob or nipple 80 in the ring aperture 82, then inserting diametrically opposite wall portions of the grate adapter 44 in the slots 86 respectively in the ring 34, thereafter screwing the handle 42 so that the stud portion 56 is received in the aperture 90 in the ring 34, and tightening the handle 42 so that the handle 42 is secure for carrying of the now compact assembly in a manner like a suitcase is carried. If desired, a jacket or enclosure may be provided for receiving the assembly for carrying, with the jacket formed so that the handle 42 suitably sticks out through an opening in the jacket. If desired, means (not shown) may be provided for suitably locking the handle 42 in the closed position of FIG. 3.

It is thus apparent that the handle 42 serves at least two separate functions, i.e., (1) to secure the grate 40 at an adjusted position on the pole 60, as seen in FIG. 1, as well as to secure the grate 40 to the ring 34 in the second assembly, and (2) to provide a means for carrying the compact assembly (second assembly) easily like the carrying of a suitcase, as seen in FIG. 3.

It is also apparent that the pole or stand 60 serves at least two separate functions, i.e., (1) to provide a means for positioning the grate 40 at a desired height above the base 38 and burning charcoal (or a butane burner or the like) thereon for cooking, as seen in FIG. 1, and (2) to provide a means for securing the ring 34 to the base 38 for re-assembling the grill 20, as seen in FIG. 2, for carrying the thereafter compact assembly (second assembly) easily like the carrying of a suitcase, as seen in FIG. 3.

It is further apparent that the legs 24 and foot pads 26 serve at least two separate functions, i.e., (1) to suitably support the grill 20 for cooking, as seen in FIG. 1, and (2) to provide a means for securing the ring 34 to the base 38 for re-assembling the grill 20, as seen in FIG. 2, for carrying the thereafter compact assembly (second assembly) easily like the carrying of a suitcase, as seen in FIG. 3.

In order to provide the desired compactness seen in FIG. 3 for easy portability like carrying a suitcase, it is important that the parts be formed so that the legs 24 are positioned within the confines of the ring 34 so that they are out of the way during carrying of the grill, as seen in FIGS. 2 and 3, so that the thereafter compact assembly (second assembly) can be easily carried like the carrying of a suitcase, as seen in FIG. 3.

Figure 9:
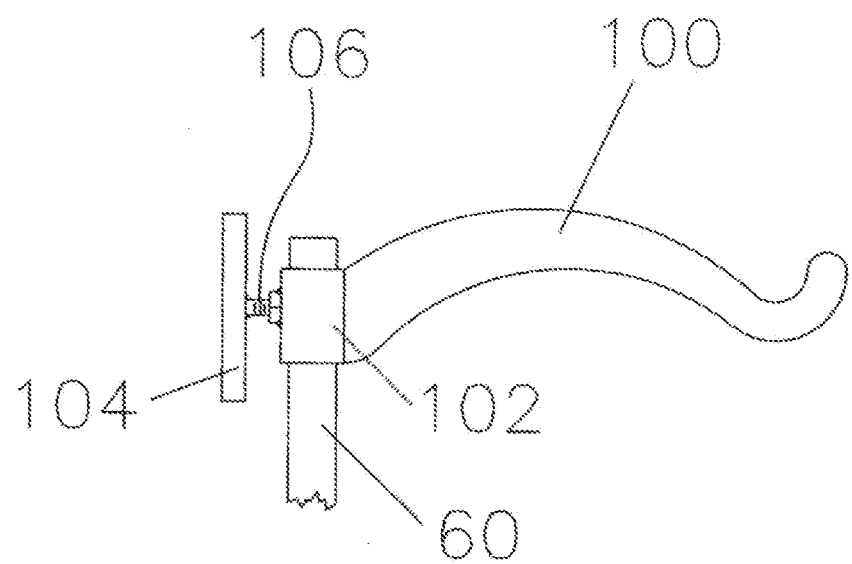
FIG. 9 is a side view of an optional pot hanger mounted on the pole member.

Referring to FIG. 9, there is shown at 100 a pot hanger or shepard's hook which may be mounted on the pole 60 and used instead of or alternately with the grate 40. It may be made, for example, of ¼ inch plate, and may be adjustably attached to the pole 60 using an adapter 102, handle 104, and stud 106 similarly as adapter 44, handle 42, and stud 56 are provided for attachment of the grate 40, except that the stud 56 need not be as long. Other similar attachments may also be provided, for example, a flared-up plate (or a plate with a lip) for use in cooking pancakes, and, for another example, a hand-cranked rotissory.

Figure 10:
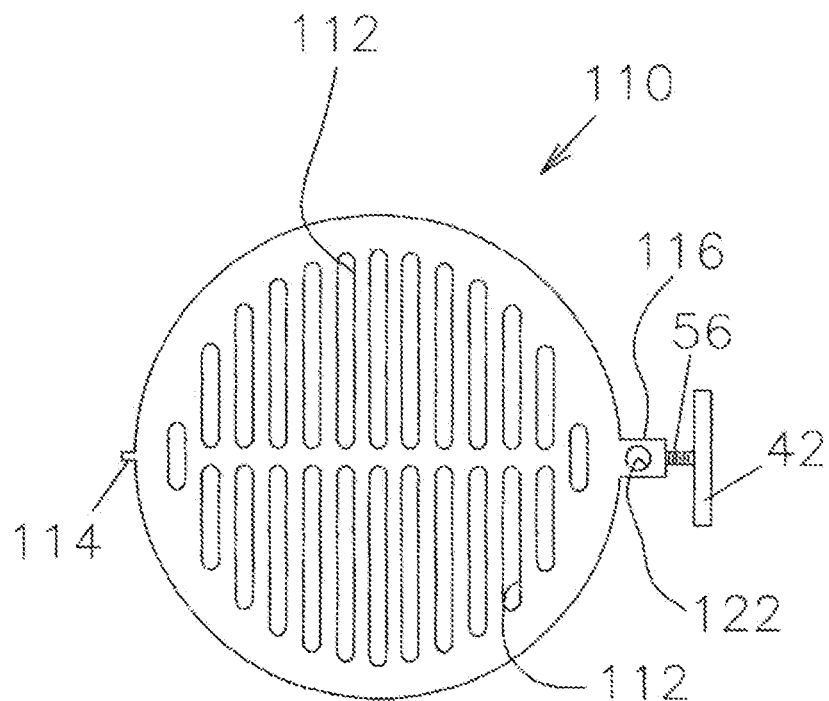
FIG. 10 is a plan view of an alternative embodiment of the cooking grate.
Figure 11:
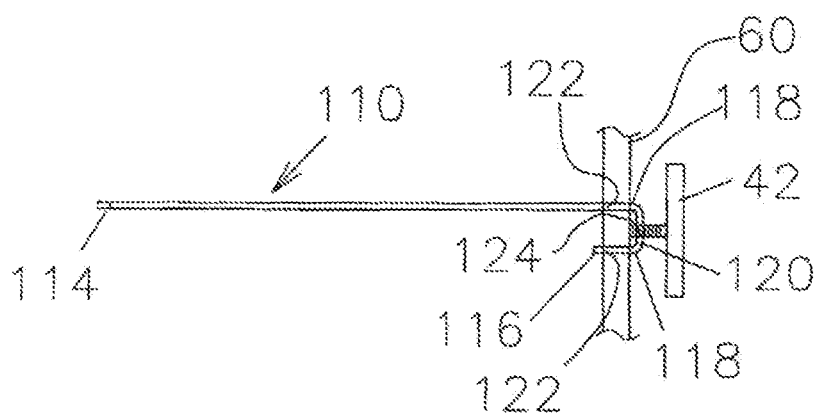
FIG. 11 is an edge view of the alternative cooking grate.

Referring to FIGS. 10 and 11, there is shown generally at 110 an alternative embodiment of the grate or upper rotator, wherein the grate 110 is formed advantageously as a single piece from a sheet of expanded metal, preferably stainless steel, for example, ¼ inch, to thereby require less labor such as the elimination of labor intensive welding and at advantageously lesser cost. Openings, illustrated at 112, are formed in the sheet. The openings 112 can be otherwise suitably shaped than as shown. The grate 110 is laser cut or otherwise suitably formed, such as by stamping to reduce costs, from the sheet, wherein a knob 114, similar to knob 80, and a rectangular protrusion 116, for use instead of but functioning similarly to adapter 44, are formed on diametrically opposed sides of the sheet. The protrusion 116 is subsequently bent into the shape illustrated in FIG. 11, i.e., having upper and lower parallel aligned portions 118 with a vertical portion 120 there between. The parallel portions 118 have aligned holes, illustrated at 122, for receiving the pole 60. The vertical portion 120 has a threaded aperture, illustrated at 124, for receiving the stud 56. Similarly as discussed with respect to FIGS. 1 to 3, the stud 56 is tightened against the pole 60 for adjustably positioning the grate 110 on the pole 60, and the knob 114 is received in aperture 82 and the portions 118 are received in slots 86 respectively and the stud 56 screwed in using handle so that the stud 56 is received in aperture 90 for securing the grate 110 in the second assembly for carrying the assembly by the handle 42 as one would carry a suitcase. The laser cutting also has the advantage of being able to provide grate designs for particular uses, for example, the provision of the slots 112 desirably helps to keep hot dogs from rolling off. If desired, the edge portion of the grate 110 may be bent or flared upwardly to help to keep hot dogs and other food thereon.

A suitable attachment (not shown) may be provided for sliding the grill into or onto a hitch of a truck or car for use of the grill while on the hitch for convenient tailgating, and a suitable means for locking the grill on the hitch may be provided. Suitable means may also be provided such as holes in various parts for locking them together.

To end on a romantic note, for honeymooners or just couples in love, candles may be placed on the base 38 to shine through the openings 37, which may accordingly be provided alternatively in forms such as flaming hearts to be more romantic.

It should be understood that, while the present invention has been described in detail herein, the invention can be embodied otherwise without departing from the principles thereof, and such other embodiments are meant to come within the scope of the present invention as defined by the appended claims.

What is claimed is:

1. A grill which is convertible between a form for use for cooking and a compact form for carrying, the grill comprising a base member for supporting a fire and including a plurality of legs having end portions respectively which are fixedly attached to said base member and extend from one surface thereof in both the form for use and the compact form, a fire containment member receivable on said base member and extending along a perimeter of said base member and having a width to rise above said base member for containing a fire on said base member, a grate for receiving food to be cooked, and a rod for connecting said grate for positioning said grate above said base member, wherein, in the compact form, said grate, said base member, said fire containment member, and said rod are connected together in a form of a suitcase with said grate and said base member engaging opposite edges of said fire containment member and defining sides of the suitcase and with said legs positioned to lie between said grate and said base member.

2. A grill according to claim 1 wherein the grill has a weight which is less than about 50 pounds, said base member has a diameter which is less than about 24 inches, and said fire containment member has a width which is less than about 12 inches.

3. A grill according to claim 1 wherein the grill has a weight which is about 20 pounds, said base member has a diameter which is about 15 inches, and said fire containment member has a width which is about 5 inches.

4. A grill according to claim 1 further comprising a handle which attaches said grate to said rod in the cooking form of the grill and which attaches said grate to said fire containment member in the compact form of the grill, whereby the grill in the compact form may be picked up by said handle for carrying.

5. A grill according to claim 4 wherein said handle includes a handle portion and a threaded stud extending centrally therefrom, and wherein said grate has a circular portion, a nipple portion, and an elongate portion diametrically opposite said nipple portion and which elongate portion is bent to define an upper portion, a vertical portion, and a lower portion, wherein said upper and lower portions have holes for receiving said rod and wherein said vertical portion has a hole for receiving said threaded stud in a manner whereby said handle can be turned to cause said threaded stud to pinch said rod to secure a selected height of said grate.

6. A grill according to claim 1 further comprising means for attaching said grate to said rod in the cooking form of the grill and for attaching said grate to said fire containment member in the compact form of the grill, wherein said means for attaching said grate to said rod in the cooking form and for attaching said grate to said fire containment member in the compact form comprises a handle, whereby said handle is positioned in the compact form so that the grill in the compact form may be picked up by said handle for carrying.

7. A grill according to claim 1 further comprising a pair of holes in said fire containment member for receiving said rod in the compact form, and means for attaching said base member to said fire containment member in the compact form, wherein said means for attaching said base member comprises foot pads on at least two of said legs respectively which foot pads are engageable by said rod when it is received in said holes in the compact form.

8. A grill which is convertible between a form for use for cooking and a compact form for carrying, the grill comprising a circular base member for supporting a fire and including a plurality of legs having end portions respectively which are fixedly attached to said base member and extend from one surface thereof in both the form for use and the compact form, wherein said plurality of legs includes at least two diametrically opposed legs, a cylindrical fire ring receivable on said base member and having a pair of diametrically opposed holes, a circular grate for receiving food to be cooked, and a rod for connecting said grate for positioning said grate above said base member, wherein, in the compact form, said grate is positioned adjacent one edge of said ring and attached to said fire ring, said base member engages another edge of said fire ring with said legs extending toward said grate, and said rod is received in said holes and engages said at least two diametrically opposed legs for thereby attaching said base member to said ring.

9. A grill according to claim 8 further comprising a handle which attaches said grate to said rod in the cooking form of the grill and which attaches said grate to said fire ring in the compact form, whereby said handle is positioned in the compact form so that the grill in the compact form may be picked up by said handle for carrying.

10. A grill according to claim 8 wherein said grate includes a tubular member attached to its edge and having an aperture therein and in which tubular member said rod is receivable in the cooking form of the grill and further includes a handle having a handle portion and a threaded stud extending centrally therefrom and which is receivable in said tubular member aperture by turning said handle portion for bearing said threaded stud against said rod for fixing said grate at a selected height above said base member in the cooking form of the grill and further includes a nipple extending from the grate edge and located diametrically opposite said tubular member, and wherein said fire ring includes an aperture adjacent said one edge thereof, a pair of slots in said one edge of said fire ring and located diametrically opposite said an aperture in said fire ring, and an aperture between said pair of slots for receiving said threaded stud, wherein in the compact form, said nipple is received in said an aperture, said tubular member is received in said slots, and said threaded stud is received in said aperture between said slots in a manner to thereby attach said grate to said fire ring, whereby said handle in the compact form is positioned for carrying the grill in a manner like carrying a suitcase.

11. A grill according to claim 10 further comprising a threaded hole in said base member and a fitting comprising a threaded tube which is internally threaded and which is threadedly receivable in said base member threaded hole, whereby a burner may be threadedly attached to said fitting on one side thereof and a fuel hose fitting attached to said fitting in said base member on an other side thereof.

12. A grill according to claim 10 further comprising a tubular member with a partially closed lower end attached to said fire ring for receiving a lower end of said rod in the cooking form of the grill.

13. A grill according to claim 8 further comprising a handle for attaching said grate to said rod in the cooking form of the grill and for attaching said grate to said fire ring in the compact form of the grill, whereby the grill in the compact form may be picked up by said handle for carrying, wherein said handle includes a handle portion and a threaded stud extending centrally therefrom, and wherein said grate is stamped and has a circular portion, a nipple portion extending from said circular portion, and an elongate portion extending from said circular portion and diametrically opposite said nipple portion and which elongate portion is bent to define an upper portion, a vertical portion, and a lower portion, wherein said upper and lower portions have holes for receiving said rod and wherein said vertical portion has a hole for receiving said threaded stud in a manner whereby said handle can be turned to cause said threaded stud to pinch said rod to secure a selected height of said grate.

14. A grill according to claim 8 wherein said at least two diametrically opposed legs have foot pads respectively which extend from the respective legs in the same circumferential direction, wherein, for assembling in the compact form, said base member is turned upside down so that said legs face upwardly, said fire ring is laid onto said base member with said one edge facing upwardly, said rod is inserted through said holes and underneath said foot pads, and said rod is attached to one of said at least two diametrically opposed legs, thereby attaching said base member to said fire ring.

15. A grill according to claim 14 further comprising an aperture in said rod, and an aperture in said one leg, a pin receivable in said apertures in said rod and said one leg for attaching said rod to said one leg in the compact form, and a lanyard one end of which is attached to said pin and an other end of which is attached to said base member, wherein said pin may be received in said one leg aperture in the cooking form of the grill.

16. A grill according to claim 8 wherein the grill includes a handle, is composed of stainless steel, and is sized for carrying by a person picking up the grill in the compact form by said handle and carrying like a suitcase is carried.

17. A kit of parts for assembling a grill in a form for cooking and for alternatively assembling the parts into a compact form for carrying, the kit comprising a circular base member for supporting a fire and including a plurality of legs having end portions respectively which are fixedly attached to said base member and extend from one surface thereof in both the form for use and the compact form, a cylindrical ring member receivable on said base member, a grate for receiving food to be cooked, a rod for positioning said grate above said base member, and means for connecting said grate to said rod at a selected height above said base member in the cooking form and for connecting said grate to said ring member in the compact form, wherein said means for connecting said grate to said rod in the cooking form and for connecting said grate to said ring member in the compact form comprises a handle, and wherein, in the compact form, said grate is attached to said ring member adjacent one edge of said ring member, said base member engages an other edge of said ring member and is attached thereto with said legs extending toward said grate, and said handle is positioned so that the compact assembled form may be picked up by said handle for carrying.

18. A kit according to claim 17 wherein said ring member has a pair of diametrically opposed holes, said plurality of legs includes at least two diametrically opposed legs, and said rod in the compact assembled form is received in said holes and engages said at least two diametrically opposed legs thereby attaching said base member to said ring member.

19. A kit according to claim 17 wherein said handle includes a handle portion and a threaded stud extending centrally therefrom, and wherein said grate has a circular portion for receiving food to be cooked, a nipple portion extending from said circular portion, and an elongate portion extending from said circular portion and diametrically opposite said nipple portion and which elongate portion is bent to define an upper portion, a vertical portion, and a lower portion, wherein said upper and lower portions have holes for receiving said rod and wherein said vertical portion has a hole for receiving said threaded stud in a manner whereby said handle portion can be turned to cause said threaded stud to pinch said rod to secure a selected height of said grate, wherein said ring member has an aperture adjacent said one edge in which said nipple portion is receivable for attaching said grate to said ring member in the compact form, a pair of slots in said one edge diametrically opposite said ring member aperture for receiving said upper and lower portions and an aperture between said slots for receiving said threaded stud in a manner to attach said grate to said ring member in the compact form.

20. A kit according to claim 19 wherein said ring member has a pair of diametrically opposed holes, said plurality of legs includes at least two diametrically opposed legs which have foot pads which extend from ends of said legs respectively in the same circumferential direction, and said rod in the compact assembled form is received in said holes and engages said foot pads in a manner to attach said base member to said ring member, a pin, a lanyard attaching said pin to said base member, said rod and one of said at least two legs have apertures respectively therein in which is receivable said pin for securing the attachment of said rod to said one of said at least two legs in the compact assembled form, wherein said pin is receivable in said aperture in said one of said at least two legs in the assembled cooking form of the grill.

* * * * *